United States Patent
Rajan et al.

(10) Patent No.: US 12,275,380 B2
(45) Date of Patent: Apr. 15, 2025

(54) PRESSURIZED STRAIGHT LINE WIPER SYSTEM

(71) Applicant: Volvo Truck Corporation, Gothenburg (SE)

(72) Inventors: Anumodh Rajan, Mysore (IN); Antriksh Shinde, Ambejogai (IN)

(73) Assignee: Volvo Truck Corporation, Gothenburg (SE)

( * ) Notice: Subject to any disclaimer, the term of this patent is extended or adjusted under 35 U.S.C. 154(b) by 328 days.

(21) Appl. No.: 17/796,941

(22) PCT Filed: Dec. 11, 2020

(86) PCT No.: PCT/EP2020/085823
§ 371 (c)(1),
(2) Date: Aug. 2, 2022

(87) PCT Pub. No.: WO2021/175476
PCT Pub. Date: Sep. 10, 2021

(65) Prior Publication Data
US 2023/0065115 A1    Mar. 2, 2023

(30) Foreign Application Priority Data
Mar. 5, 2020   (IN) .............................. 202041009509

(51) Int. Cl.
*B60S 1/34* (2006.01)
*B60S 1/38* (2006.01)
*B62D 33/06* (2006.01)

(52) U.S. Cl.
CPC ........... *B60S 1/3404* (2013.01); *B60S 1/3411* (2013.01); *B60S 1/3463* (2013.01); *B60S 1/38* (2013.01);
(Continued)

(58) Field of Classification Search
CPC ........ B60S 1/38; B60S 1/3411; B60S 1/3404; B60S 1/28; B60S 1/3463; B60S 1/3801; B60S 2001/3812; B60S 2001/3825
(Continued)

(56) References Cited

U.S. PATENT DOCUMENTS

| | | | |
|---|---|---|---|
| 1,777,541 A | 10/1930 | Anderson | |
| 2,789,007 A * | 4/1957 | Howell | B60H 1/242 |
| | | | 454/159 |

(Continued)

FOREIGN PATENT DOCUMENTS

| | | | |
|---|---|---|---|
| FR | 2917359 A1 * | 12/2008 | ............ B60S 1/0491 |
| JP | 61282151 A * | 12/1986 | |

(Continued)

OTHER PUBLICATIONS

Machine language translation of description portion of JP 61-282151, published Dec. 1986. (Year: 1986).*

(Continued)

*Primary Examiner* — Gary K. Graham
(74) *Attorney, Agent, or Firm* — Withrow & Terranova, PLLC

(57) ABSTRACT

Vehicle comprising
a cab defining a driver compartment by a windshield,
a wiping arrangement configured to wipe the windshield over a wiping area, the wiping arrangement comprising at least one wiper including a support movably mounted on the cab and a blade mounted on the support to contact the windshield along a contact length,
wherein the wiping arrangement includes an urging system configured to urge the blade against the windshield, and wherein the urging system is configured to apply a pressure on the blade along the contact length by a pressurized fluid.

12 Claims, 4 Drawing Sheets

(52) U.S. Cl.
CPC ............. *B60S 2001/3812* (2013.01); *B60S 2001/3825* (2013.01); *B62D 33/06* (2013.01)

(58) Field of Classification Search
USPC ............ 15/250.361, 250.43, 250.44, 250.24, 15/250.29
See application file for complete search history.

(56) References Cited

U.S. PATENT DOCUMENTS

| | | | |
|---|---|---|---|
| 2,845,803 A | 8/1958 | Price | |
| 3,371,368 A * | 3/1968 | Walker | B60S 1/3415 15/250.04 |
| 3,431,577 A * | 3/1969 | Minsky | B60S 1/3848 15/250.04 |
| 3,548,440 A * | 12/1970 | Kothari | B60J 10/75 15/250.1 |
| 3,849,827 A * | 11/1974 | Coropolis | B60J 10/74 15/250.19 |
| 5,564,156 A * | 10/1996 | Habba | B60S 1/20 15/250.4 |
| 5,979,010 A | 11/1999 | Dockery et al. | |
| 9,085,283 B2 | 7/2015 | Lieven | |
| 2019/0009749 A1 | 1/2019 | Gorce | |

FOREIGN PATENT DOCUMENTS

| | | | | |
|---|---|---|---|---|
| WO | WO-9601754 A1 * | 1/1996 | ................ | B60S 1/34 |
| WO | WO-2019053481 A1 * | 3/2019 | ................ | B60S 1/38 |
| WO | WO-2020187471 A1 * | 9/2020 | ............ | B60S 1/3406 |

OTHER PUBLICATIONS

Machine language translation of description portion of French publication 2917359, published Dec. 2008. (Year: 2008).*

International Search Report and Written Opinion for International Patent Application No. PCT/EP2020/085823, mailed Mar. 22, 2021, 10 pages.

* cited by examiner

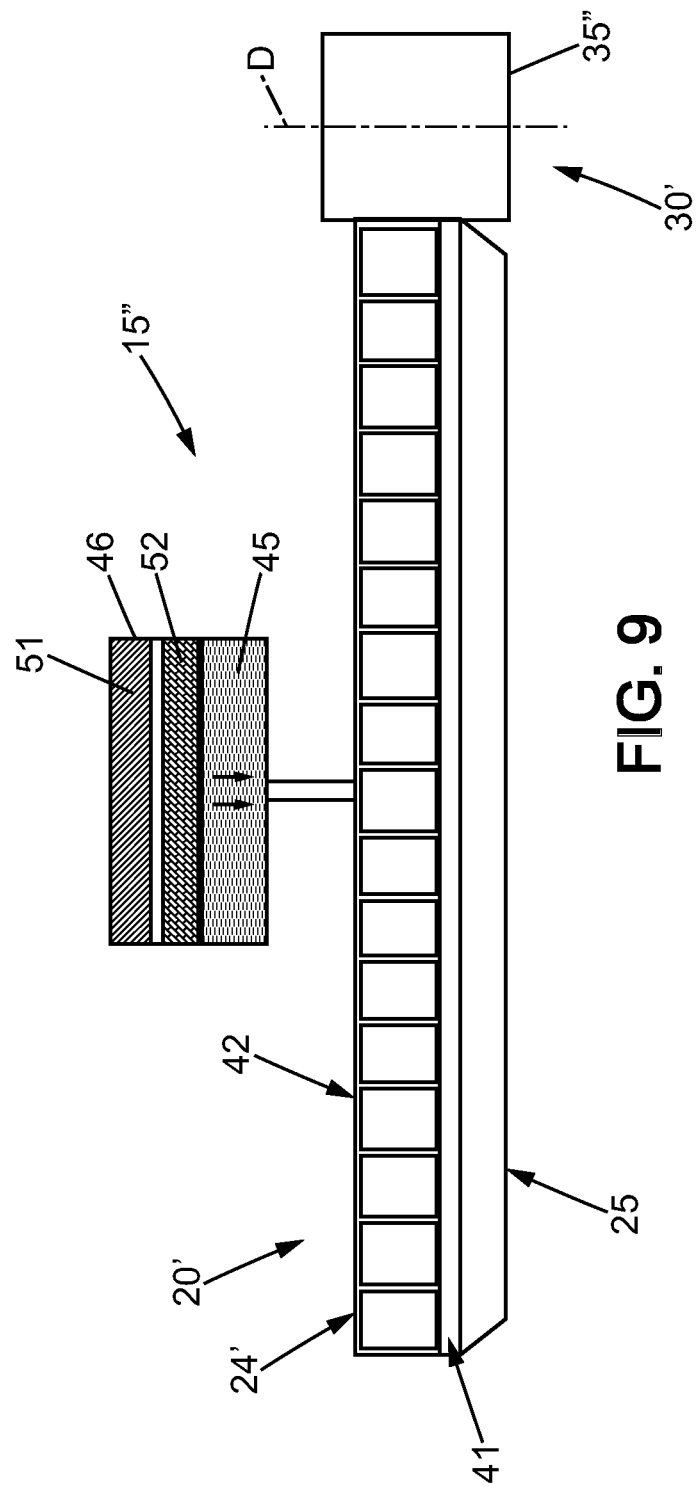

PRESSURIZED STRAIGHT LINE WIPER SYSTEM

This application is a 35 USC 371 national phase filing of International Application No. PCT/EP2020/085823, filed Dec. 11, 2020, which claims the benefit of Indian Patent Application number 202041009509, filed Mar. 5, 2020, the disclosures of which are incorporated herein by reference in their entireties.

TECHNICAL FIELD

This disclosure relates to a vehicle comprising a wiping arrangement.

In particular, this disclosure relates to a vehicle comprising:
- a cab presenting a longitudinal direction and defining a driver compartment, the driver compartment being delimited in the longitudinal direction by a windshield,
- a wiping arrangement configured to wipe the windshield over a wiping area, the wiping arrangement comprising at least one wiper including a support movably mounted on the cab and a blade mounted on the support to contact the windshield along a contact length.

BACKGROUND ART

It is known, especially from U.S. Pat. No. 9,085,283 to provide the wiping arrangement with an urging system configured to urge the blade against the windshield.

However, the known wiping arrangement does not provide entire satisfaction in terms of uniformity of wiping over the wiping area.

SUMMARY

This disclosure aims at solving the above mentioned problems.

To that end, the invention proposes a vehicle comprising:
- a cab presenting a longitudinal direction and defining a driver compartment, the driver compartment being delimited in the longitudinal direction by a windshield,
- a wiping arrangement configured to wipe the windshield over a wiping area, the wiping arrangement comprising at least one wiper including a support movably mounted on the cab and a blade mounted on the support to contact the windshield along a contact length, wherein the wiping arrangement includes an urging system configured to urge the blade against the windshield, wherein the urging system is configured to apply a pressure on the blade along the contact length by a pressurized fluid.

The urging system according to the invention provides a continuous and homogeneous contact over the whole contact length of the blade, thereby improving uniformity of wiping over the wiping area.

The urging system may include a flexible diaphragm extending along the contact length and to which the blade is attached, and a duct extending in the support and opening on the flexible diaphragm opposite the blade along the contact length, the urging system being configured to supply the duct with the pressurized fluid.

The urging system may include a reservoir defining an inner space for receiving a fluid, and a pressurizing device configured to pressurize the fluid within the inner space, the reservoir being mounted on the support in fluid communication with the blade.

The pressurizing device may be arranged within the reservoir.

The reservoir may extend along a reservoir axis between a bottom and an end wall provided with an outlet, and the pressurizing device is electromagnetic, the pressurizing device comprising:
- an electromagnet at the bottom of the reservoir,
- a magnetic piston movably mounted within the reservoir between the electromagnet and the end wall, and
- a power supply connected to the electromagnet to control polarity of said electromagnet, the inner space being formed between the magnetic piston and the end wall.

The reservoir may be mounted on the support in a removable manner.

The support may extend between opposite ends, the reservoir being arranged at one of the ends of the support.

The wiping arrangement may comprise a central unit connected to the urging system, the central unit being configured to monitor a position of the wiper over the wiping area and to vary the pressure of the pressurized fluid on the blade with respect to the position of the wiper.

The windshield may extend in a transverse direction between opposite lateral edges, and the wiping arrangement may comprise a driving system configured to move the support in translation along the transverse direction.

Such provisions may enhance the wiping area.

The windshield may have opposite lower and upper edges between the lateral edges, and the driving system may comprise lower and upper slides extending in the transverse direction respectively along the lower and upper edges, and at least one actuator, the support being slidably mounted on the lower and upper slides and connected to the actuator to reciprocate in the transverse direction.

The support may comprise lower and upper mounting portions mounted respectively on the lower and upper slides, and the driving system may comprise lower and upper actuators connected respectively to the upper and lower mounting portions to reciprocate said lower and upper mounting portions in the transverse direction.

The wiping arrangement may be configured so that the wiping area extends over an essential portion of a width of the windshield between the lateral edges of the windshield.

The wiping arrangement may comprise two wipers facing each other, the support of each of the wipers being moveable along a stroke from one of the lateral edges to a middle portion of the windshield.

The wiping arrangement with the driving system configured to move the support in translation along the transverse direction may be compatible with curved windshield in which the lateral edges are offset in the longitudinal direction with respect to a remaining portion of the windshield.

Alternatively, the wiping arrangement may comprise a driving system configured to move the support in rotation around a rotation axis perpendicular to the windshield.

BRIEF DESCRIPTION OF DRAWINGS

Other features, details and advantages will be shown in the following detailed description made in reference to the enclosed drawings, in which:

FIG. 9 is a view of an alternative wiping arrangement in which the wiper is moved in rotation around a rotation axis perpendicular to the windshield.

DESCRIPTION OF EMBODIMENTS

Figures and the following detailed description contain, essentially, some exact elements. They can be used to enhance understanding the disclosure and, also, to define the invention if necessary.

Figure 1:
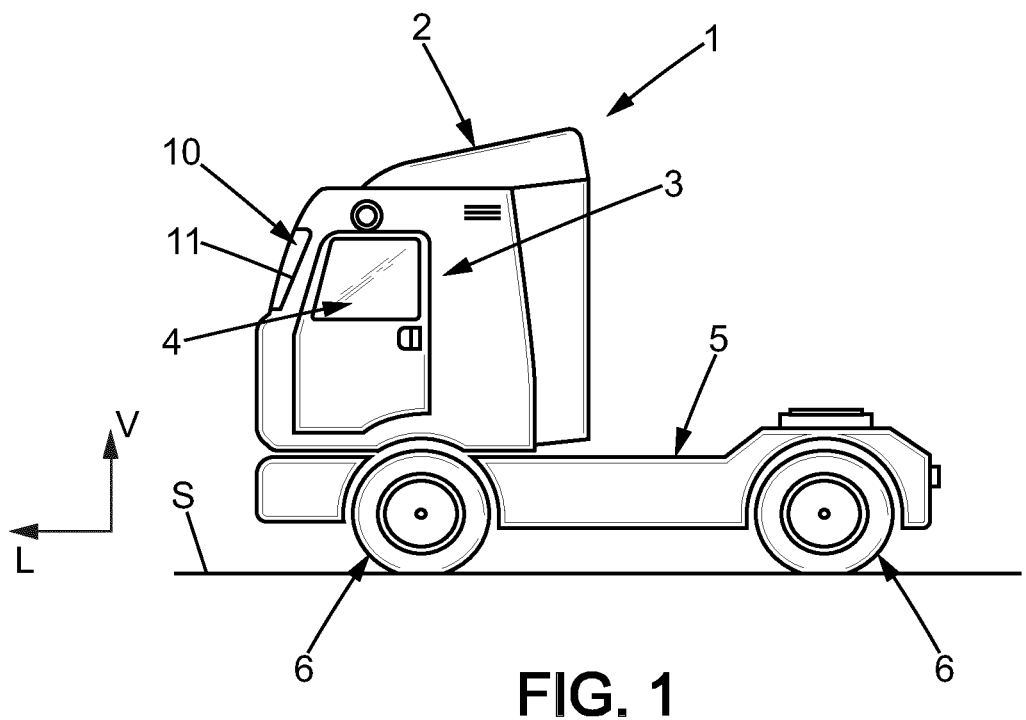
FIG. 1 is a view in elevation of a vehicle according to an embodiment of the invention, the vehicle comprising a cab defining a driver compartment delimited by a windshield.

FIG. 1 represents a vehicle 1 according to an embodiment of the invention. In the represented embodiment, although not limited thereto, the vehicle 1 is a tractor of a truck comprising a frame 2 extending along a longitudinal direction L corresponding to a direction along which the vehicle 1 moves forward or rearward on a ground surface S. The frame 2 comprises a cab 3 defining a driver compartment 4 with a driving place where a driver may seat, and a chassis 5 adjoining the cab 3 in the longitudinal direction L. The cab 3 and the chassis 5 are mounted on wheels 6 driven by a motor system, not shown.

The cab 3 comprises a windshield 10 delimiting the driver compartment 4 in the longitudinal direction L. The windshield 10 extends in a transverse direction T, perpendicular to the longitudinal direction L, between opposite lateral edges 11 and in a vertical direction V, perpendicular to the longitudinal L and transversal T directions, between lower 12 and upper 13 edges. The lateral edges are parallel to each other and extend along the vertical direction V and the lower 12 and upper 13 edges are parallel to each other and extend in the transvers direction T between the lateral edges 11. In the illustrated embodiment, the windshield 10 is curved so that the lateral edges 11 are offset in the longitudinal direction L with respect to a remaining portion of the windshield 10.

Figure 2:
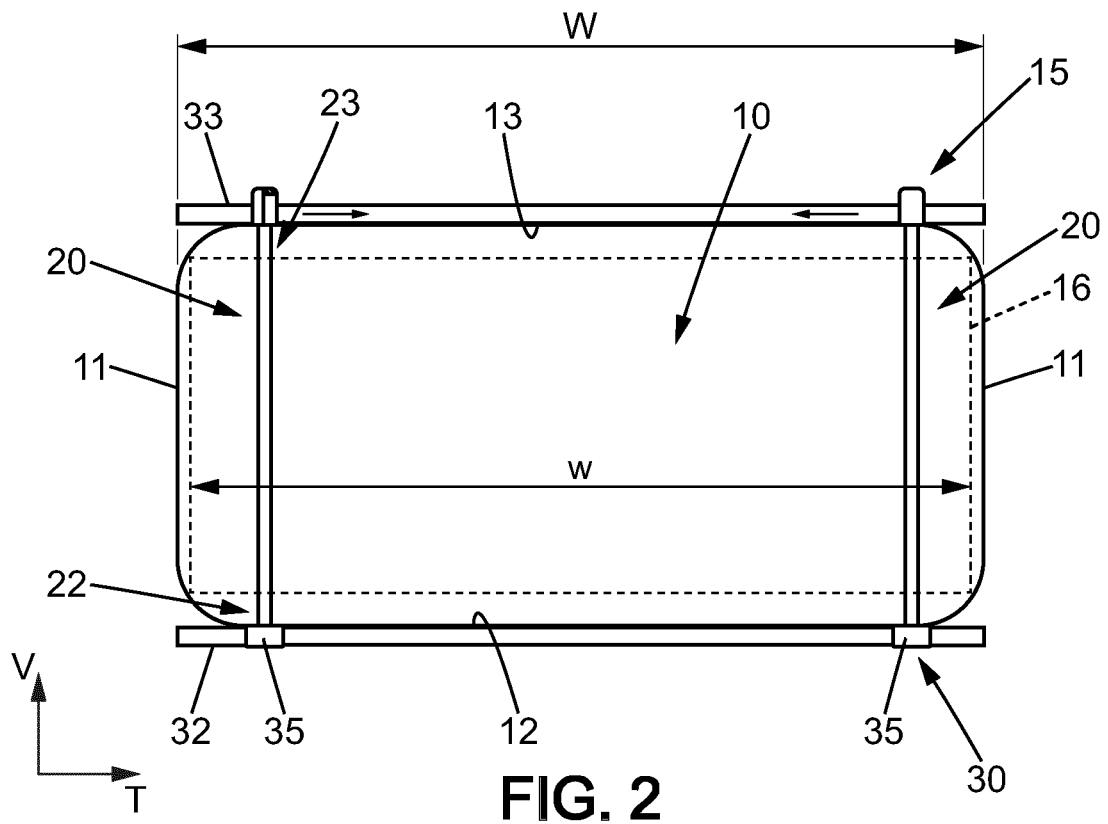
FIGS. 2 and 3 are front views of a wiping arrangement of the vehicle of FIG. 1, the wiping arrangement being configured to wipe the windshield over a wiping area, the wiping arrangement comprising two wipers facing each other, and a driving system configured to move the wipers in translation along a transverse direction over a width of the windshield between lateral edges, the driving system comprising two actuators each connected to one of the wipers to reciprocate the wipers in the transverse direction.
Figure 3:
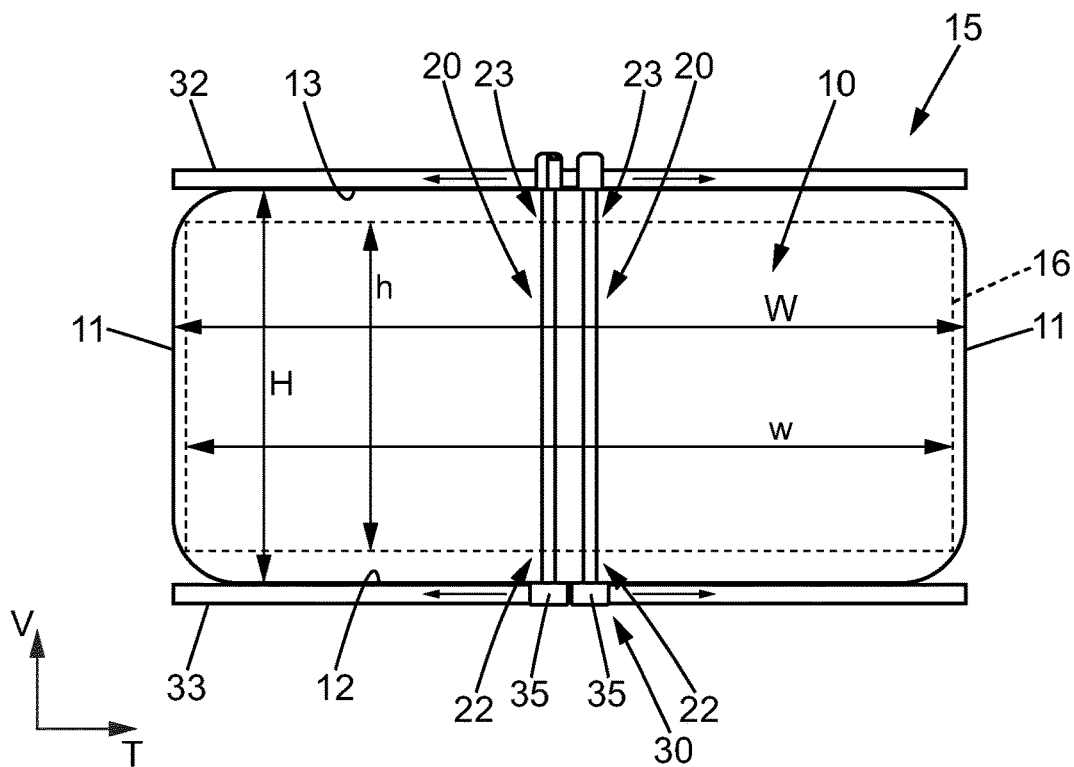

As shown in FIGS. 2 and 3, the vehicle 1 comprises a wiping arrangement 15 configured to wipe the windshield 10 over a wiping area 16.

The wiping arrangement 16 comprises two wipers 20 facing each other, and a driving system 30 configured to move the wipers 20 in translation along the transverse direction T.

The driving system 30 comprises lower 32 and upper 33 slides extending in the transverse direction T respectively along the lower 12 and upper 13 edges. Each wiper 20 has lower 22 and upper 23 mounting portions that are slidably mounted on the lower 32 and upper 33 slides.

The lower 32 and upper 33 slides are dimensioned to define a width w of the wiping area 16. In particular, the lower 32 and upper 33 slides are dimensioned so that the width w of the wiping area 16 extends over an essential portion of a width W of the windshield 10 between lateral edges 11. The essential portion of the width W of the windshield 10 is especially more than 75% of the width W, preferably more than 90% of the width W, in particular more than 95% of the width W. The lower 32 and upper 33 slides may be conformed to follow a curvature of the curved windshield 10.

The driving system 30 also comprises one or several actuators 35 connected to the wipers to reciprocate them in the transverse direction T. In the represented embodiment, two actuators 35 are connected respectively to the lower mounting portions 22 of the wipers 20 so that each of the wipers 20 is moveable along a stroke from one of the lateral edges 11 to a middle portion of the windshield 10. The actuator 35 may be of any suitable type such as an electric motor.

The invention is not limited to a wiping arrangement 15 including two wipers each actuated by one actuator 35 over a half of the wiping area 16. Any other wiping arrangement 15 implementing one or several wipers and one or several actuators to move the wipers along any suitable stroke could be provided.

Figure 4:
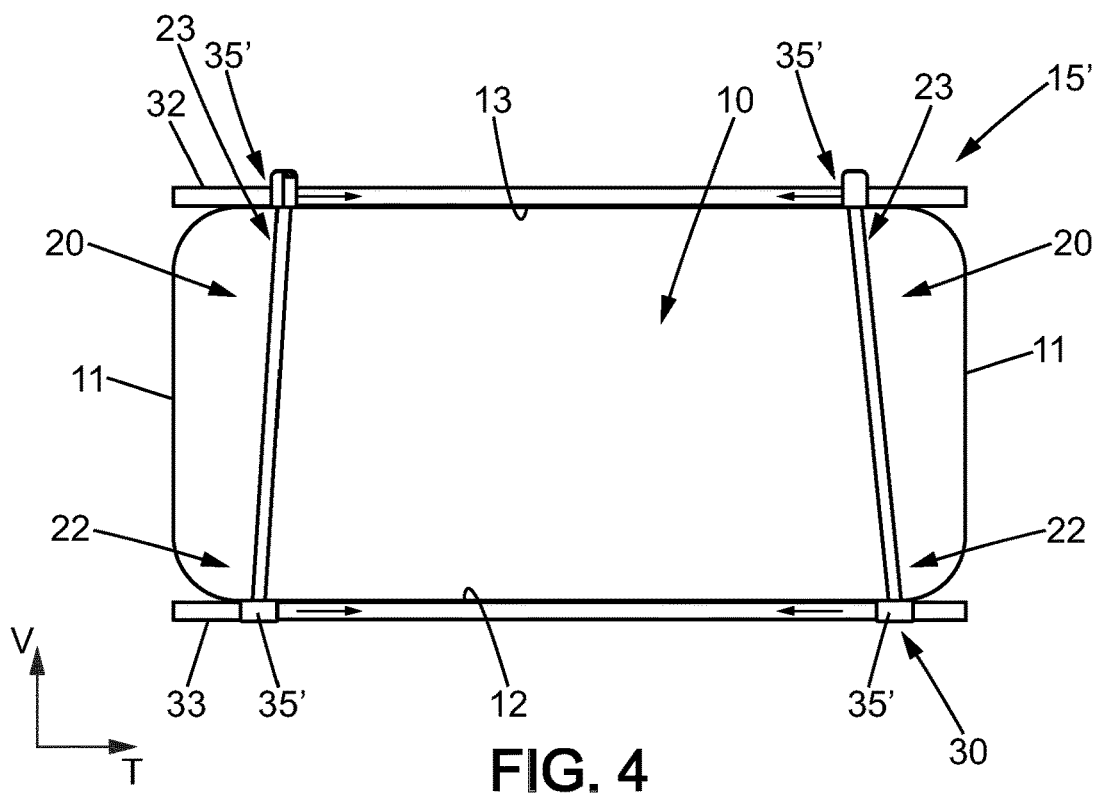
FIG. 4 is a front view of an alternative wiping arrangement of the vehicle of FIG. 1, the driving system comprising lower and upper actuators connected respectively to lower and upper mounting portions of each wiper to reciprocate independently said lower and upper mounting portions in the transverse direction.

For example, in an alternative shown in FIG. 4, the driving system 30' of the wiping arrangement 15' comprises lower and upper actuators 35' connected respectively to the lower 22 and upper 23 mounting portions of each wiper 20 to reciprocate independently these lower 22 and upper 23 mounting portions in the transverse direction T.

Figure 5:
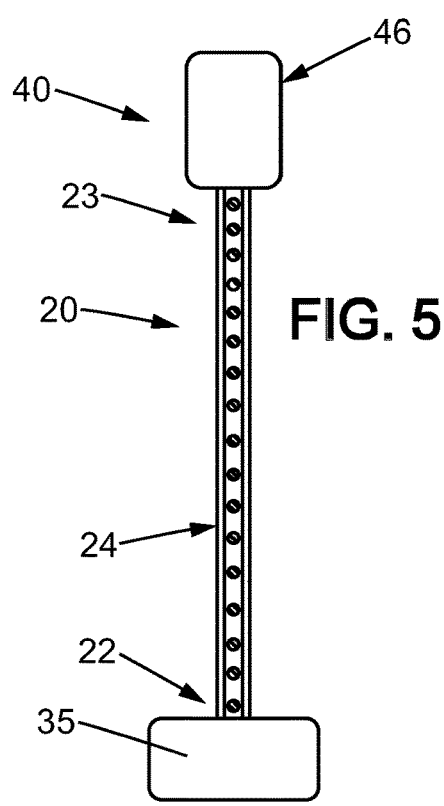
FIGS. 5 and 6 are enlarged front and side views of one of the wipers of the wiping arrangement of FIGS. 2 and 3, the wiper including a support movably mounted on the cab and a blade mounted on the support to contact the windshield along a contact length, the wiping arrangement including an urging system configured to urge the blade against the windshield through application of a pressure on the blade along the contact length by a pressurized fluid.
Figure 6:
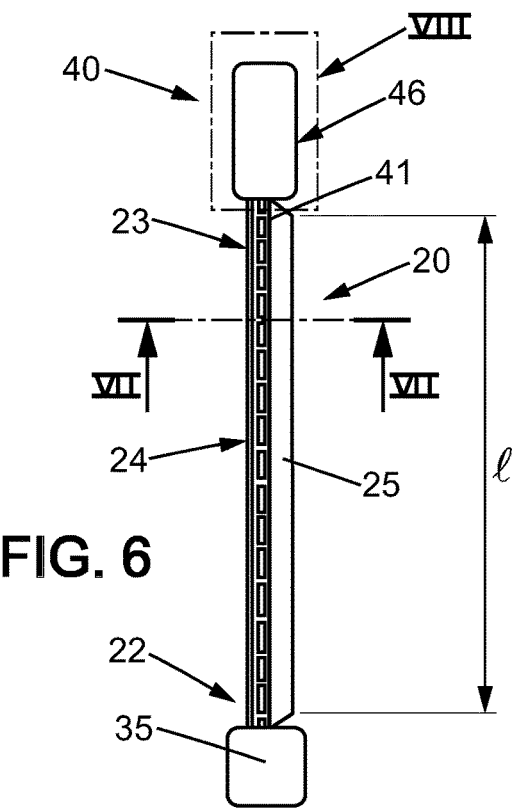

The wiper 20, represented in FIGS. 5 and 6, includes a support 24 extending between opposite ends at the vicinity of which the lower 22 and upper 23 mounting portions are respectively arranged. The wiper 20 also includes a blade 25 mounted on the support 24 to contact the windshield 10 along a contact length l.

The blade 25 is conformed so that the contact length l defines a width h of the wiping area 16. In particular, the blade 25 is dimensioned so that the height h of the wiping area 16 extends over an essential portion of a height H of the windshield 10 between the lower 12 and upper edges. The essential portion of the height H of the windshield 10 is especially more than 75% of the height H, preferably more than 90% of the height H, in particular more than 95% of the height H.

To ensure continuous and homogeneous contact with the windshield 10 over the whole contact length l of the blade 25, the wiping arrangement 15 includes an urging system 40 configured to urge the blade 25 against the windshield 10.

Figure 7:
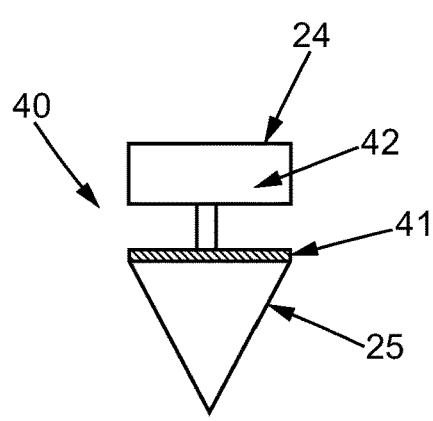
FIG. 7 is an enlarged view in section along reference line VII-VII on FIG. 6, illustrating a flexible diaphragm of the urging system to which the blade is attached, and a duct of the urging system opening on the flexible diaphragm opposite the blade and supplied with the pressurized fluid.
Figure 8:
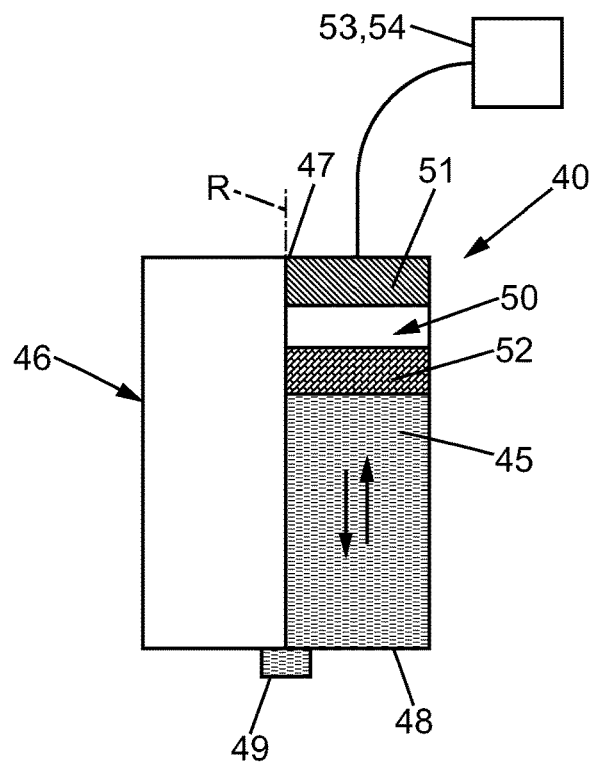
FIG. 8 is an enlarged view of detail VIII of FIG. 6, illustrating a reservoir of the urging system mounted on the support of the wiper in fluid communication with the blade, an electromagnetic pressurizing device being arranged within the reservoir to pressurize the fluid within an inner space of the reservoir.

As apparent from FIG. 7, the urging system 40 includes a flexible diaphragm 41 extending along the contact length l and to which the blade 25 is attached. The urging system

40 also includes a duct 42 extending in the support 24 and opening on the flexible diaphragm 41 opposite the blade 25 along the contact length l.

The urging system is further configured to supply the duct 42 with a pressurized fluid 45 so that a pressure is applied on the blade 25 along the contact length l through the flexible diaphragm 41.

To that end, a reservoir 46 defining an inner space for receiving the fluid 45 is mounted on the support. The reservoir 46 extends along a reservoir axis R between a bottom 47 and an end wall 48 provided with an outlet 49. In the illustrated embodiment, the reservoir is mounted, preferably in a removable manner, at the end of the upper mounting portion 23, opposite the lower mounting portion 32 connected to the actuator 35, with the outlet 49 opening in the duct 42 to have the reservoir 46 in fluid communication with the blade 25.

A pressurizing device 50 is configured to pressurize the fluid 45 within the inner space of the reservoir 46. In the illustrated embodiment, the pressurizing device 50 is arranged within the reservoir and is electromagnetic. In particular, the pressurizing device 50 comprises:
- an electromagnet 51 at the bottom 47 of the reservoir 46,
- a magnetic piston 52 movably mounted within the reservoir 46 between the electromagnet 51 and the end wall 48, and
- a power supply 53 connected to the electromagnet 51 to control its polarity.

The inner space is formed between the magnetic piston 52 and the end wall 48 so that when the electromagnet 51 is activated, it repels the magnet piston 52 to pressurize the fluid 45. Once the fluid 45 is pressurized, the pressure is transferred to the blade 25 by the flexible diaphragm 41 ensuring contact at all points on the windshield 10.

The electromagnet 51 may be activated and poles varied to achieve the required pressure in the wipers 20. Control of the pressure can be done manually by the driver when he feels that the pressure is not sufficient. The pressure can also be varied dynamically according to a position of the wiper 20 on the windshield 10 using an electromagnet 51 controlled by a central unit 54 connected to the urging system 40 and is configured to monitor the position of the wiper 20 over the wiping area 16. The central unit 54 can be stored with the curvature of the windshield 10.

Although disclosed in relation with a wiper 20 configured to reciprocate in translation along the transverse direction, the urging system 40 and the pressurizing device 50 can be implemented in wipers presenting any other suitable configuration. In particular, as shown in FIG. 9, the urging system 40 and the pressurizing device 50 can be implemented in a conventional wiping arrangement 15" wherein a driving system 30' comprises an actuator 35" driving the support 24' of the wiper 20' in rotation around a rotation axis D perpendicular to the windshield 10. The support 24' of the wiper 20' is then configured to enable attachment of the reservoir 46 in fluid communication with the blade 25 trough the duct 42 and the flexible diaphragm 41. For example, the reservoir 46 is attached to a middle portion of the support 24'.

The invention claimed is:

1. A vehicle comprising:
a cab presenting a longitudinal direction and defining a driver compartment, the driver compartment being delimited in the longitudinal direction by a windshield, and
a wiping arrangement configured to wipe the windshield over a wiping area, the wiping arrangement comprising at least one wiper including a support movably mounted on the cab and a blade mounted on the support to contact the windshield along a contact length,
wherein the wiping arrangement includes an urging system configured to urge the blade against the windshield, and
wherein the urging system is configured to apply a pressure on the blade along the contact length by a pressurized fluid,
wherein the urging system includes a reservoir defining an inner space for receiving the fluid, and a pressurizing device configured to pressurize the fluid within the inner space, the reservoir being mounted on the support in fluid communication with the blade,
wherein the pressurizing device is arranged within the reservoir, and
wherein the reservoir extends along a reservoir axis between a bottom and an end wall provided with an outlet, and the pressurizing device is electromagnetic, the pressurizing device comprising:
an electromagnet at the bottom of the reservoir,
a magnetic piston movably mounted within the reservoir between the electromagnet and the end wall, and
a power supply connected to the electromagnet to control polarity of the electromagnet, the inner space being formed between the magnetic piston and the end wall.

2. The vehicle of claim 1, wherein the urging system includes a flexible diaphragm extending along the contact length and to which the blade is attached, and a duct extending in the support and opening on the flexible diaphragm opposite the blade along the contact length, the urging system being configured to supply the duct with the pressurized fluid.

3. The vehicle of claim 1, wherein the reservoir is mounted on the support in a removable manner.

4. The vehicle of claim 1, wherein the support extends between opposite ends, the reservoir being arranged at one of the ends of the support.

5. The vehicle of claim 1, wherein the wiping arrangement comprises a central unit connected to the urging system, the central unit being configured to monitor a position of the wiper over the wiping area and to vary the pressure of the pressurized fluid on the blade with respect to the position of the wiper.

6. The vehicle of claim 1, wherein the windshield extends in a transverse direction between opposite lateral edges, and the wiping arrangement comprises a driving system configured to move the support in translation along the transverse direction.

7. The vehicle of claim 6, wherein the windshield has opposite lower and upper edges between the lateral edges, and the driving system comprises lower and upper slides extending in the transverse direction respectively along the lower and upper edges, and at least one actuator, the support being slidably mounted on the lower and upper slides and connected to the actuator to reciprocate in the transverse direction.

8. The vehicle of claim 6, wherein the support comprises lower and upper mounting portions mounted respectively on the lower and upper slides, and the driving system comprises a lower actuator and an upper actuators actuator connected respectively to the lower and upper mounting portions to reciprocate the lower and upper mounting portions in the transverse direction.

9. The vehicle of claim 6, wherein the wiping arrangement is configured so that the wiping area extends over an essential portion of a width of the windshield between the lateral edges of the windshield.

10. The vehicle of claim 6, wherein the wiping arrangement comprises two wipers facing each other, the support of each of the wipers being moveable along a stroke from one of the lateral edges to a middle portion of the windshield.

11. The vehicle of claim 6, wherein the windshield is curved so that the lateral edges are offset in the longitudinal direction with respect to a remaining portion of the windshield.

12. The vehicle of claim 1, wherein the wiping arrangement comprises a driving system configured to move the support in rotation around a rotation axis perpendicular to the windshield.

* * * * *